United States Patent [19]

Rähder et al.

[11] Patent Number: 5,737,214

[45] Date of Patent: Apr. 7, 1998

[54] METHOD FOR CONTROLLING A FUNCTION UNIT WITH A STEERING AND CONTROL DEVICE

[75] Inventors: Christian Rähder, Lückendorf; Jens-Uwe Müller, Olbersdorf, both of Germany

[73] Assignee: ABB Patent GmbH, Mannheim, Germany

[21] Appl. No.: 344,487

[22] Filed: Nov. 23, 1994

Related U.S. Application Data

[63] Continuation-in-part of Ser. No. 74,205, filed as PCT/EP91/01967, Oct. 16, 1991 published as WO93/08515, Apr. 29, 1993, abandoned.

[51] Int. Cl.$^6$ .................................................. G05B 13/02
[52] U.S. Cl. .......................... 364/148; 395/61; 395/900
[58] Field of Search .............................. 364/148, 152, 364/160–163, 172–175; 395/900, 903, 906, 22, 61, 51, 50

[56] References Cited

U.S. PATENT DOCUMENTS

| | | | |
|---|---|---|---|
| 3,964,443 | 6/1976 | Hartford | 123/32 EA |
| 4,619,234 | 10/1986 | Okamoto | 123/357 |
| 5,043,862 | 8/1991 | Takahashi et al. | 364/162 |
| 5,245,698 | 9/1993 | Matsunaga | 364/163 |
| 5,455,890 | 10/1995 | Wang | 395/50 |

FOREIGN PATENT DOCUMENTS

| | | | |
|---|---|---|---|
| 0 445 729 | 9/1991 | European Pat. Off. | G05B 13/04 |
| 0 424 890 | 4/1993 | European Pat. Off. | |
| 1 595 122 | 8/1981 | United Kingdom | H04N 1/40 |
| 91/10821 | 7/1991 | WIPO | F02D 41/18 |

OTHER PUBLICATIONS

Information Science 1985, Elsevier Publishing, New York, M. Sugeno, pp. 59–83, An introductory Survey . . .
Publication "Automatisierungstechnik" No. Feb. 1985, Fuzzy Controls and Linguistic Control Algorithms–. . . pp. 45–52.

*Primary Examiner*—Reba I. Elmore
*Assistant Examiner*—Steven R. Garland
*Attorney, Agent, or Firm*—Herbert L. Lerner; Laurence A. Greenberg

[57] ABSTRACT

A method is provided for steering and controlling a functional unit with a steering and control device. The steering and control device includes a plurality of normalizing units, each unit having an input for receiving a respective input variable and being operative for generating a normalized input variable. An analytic controller has a plurality of inputs being equal to at least the plurality of normalizing units, for receiving the normalized input variables, the analytic controller being operative for analytically combining the normalized input variables in accordance with a plurality of knowledge-based control rules to form an actuating variable. A function unit has an input receiving the actuating variable, the function unit being operative for generating a process-controlled variable. The method includes defining the knowledge-based control rules as a plurality of continuous, substantially non-linear mathematical functions; and analytically combining the plurality of the continuous substantially non-linear mathematical functions to form the process-controlled variable.

16 Claims, 10 Drawing Sheets

| STATE-NO. | INPUT VALUES | | OUTPUT VALUES |
|---|---|---|---|
| | Δp | Δṗ | y |
| 1 | 0.5 | -0.1 | -0.5 |
| 2 | -0.5 | -0.0666 | -2.53 |
| 3 | 0.16 | -0.033 | -0.32 |
| 4 | -0.33 | -0.066 | -0.4 |
| 5 | 0.5 | 0.1 | 3.0 |
| 6 | 0.5 | 0.033 | 1.85 |

CONTROL RULES

Fig.9

METHOD FOR CONTROLLING A FUNCTION UNIT WITH A STEERING AND CONTROL DEVICE

CROSS-REFERENCE TO RELATED APPLICATIONS

This application is a Continuation-In-Part of application Ser. No. 08/074,205, filed Jun. 9, 1993, now abandoned which was a Continuation of International Application Serial No. PCT/EP91/01967, filed Oct. 16, 1991, now abandoned.

FIELD OF THE INVENTION

The invention relates to a method for controlling a function unit with a steering and control device, having functional instructions for its control of operation, wherein the functional instructions are built on knowledge-based control rules.

BACKGROUND OF THE INVENTION

The method can be used for steering and controlling or optimizing technical systems and processes, such as, for example, a power plant process.

The operation of a steering and controlling method can be achieved in various ways, for instance with the aid of a mathematical model for the static and/or dynamic performance of the process, or with the aid of an empirically ascertained structure and/or parameters. Another option is to specify actuating or correcting variables for selected operating points of a process, by making technological findings or conditions the basis for the relationships between the actuating or correcting variables and the process input variables or process properties. The latter group includes knowledge-based steering and control methods that are the point of departure for the invention.

DESCRIPTION OF THE RELATED ART

Such knowledge-based steering and control methods have heretofore only been rarely employed. The best known are probably devices based on the fuzzy set theory for handling fuzzy sets. Such fuzzy logic is described, for instance, in the journal entitled c't 1991, No. 3, pp. 188–200, wherein page 199 describes fuzzy control. Fuzzy controllers have been constructed in principle by means of logical operators for linking discretely valued process or input variables and associating their performance approximately with discontinuous controllers. However, as can be learned from the journal entitled Automatisierungstechnik at [Automation at], No. 2/1985, pp. 45–52, particularly page 49, fuzzy controllers that have been made so far usually do not exhibit satisfactory performance. Finding a process model by trial and error is not considered satisfactory, nor have hopes for a learning, self-optimizing controller been fulfilled.

It has been found that empirically constructed controllers often function reliably, but especially if the process has complicated dynamics or a complicated structure, the quality of control is unsatisfactory, because the operating point is not adhered to accurately, or because fluctuations produce undesirable technological effects. Sacrifices in production efficiency and sacrifices from increased system wear result. Under some circumstances, when using analytical drafting methods, it may be very difficult or complicated to reproduce the static and dynamic properties of a process in the performance of a steering and control method accurately enough. The required process with mathematical models and methods is unfavorable for the adaptation and variation of structure and parameters. As a rule, the actual process performance cannot be described accurately to an adequate degree and modelling inaccuracies that arise lead to static and dynamic errors. In complex processes, the real-time capacity may sometimes not be achieved with satisfaction.

It is accordingly an object of the invention to provide a knowledge-based steering and control method, which overcomes the hereinafore-mentioned disadvantages of the heretofore-known methods of this general type and which operates on the basis of knowledge-based control rules.

SUMMARY OF THE INVENTION

This object is attained by a steering and control method, having functional instructions for its operation which are based on knowledge-based control rules, wherein knowledge-based control rules are associated pointwise with actuating or controlling variables for selected process states, and wherein an arbitrary number of control rules are linked by one or more continuous, generally non-linear mathematical functions, with the aid of which actuating or controlling variables for arbitrary process states can be determined. The mathematical functions are determined by a number n of mutually dependent or independent input variables of the controller that define a process state. A number m of actuating or controlling variables can be determined with the steering and control method.

More specifically, with the foregoing and other objects in view there is provided, in accordance with the invention, a method for steering and controlling a functional unit with steering and control means, the steering and control means including a plurality of normalizing units, each normalizing unit having an input for receiving a respective input variable and being operative for generating a normalized input variable; an analytical controller having a plurality of inputs being equal to at least the plurality of normalizing units, for receiving the normalized input variables, the analytic controller being operative for analytically combining the normalized input variables in accordance with a plurality of knowledge-based control rules to form at least one actuating variable; and a function unit having an input receiving the actuating variable, the function unit being operative for generating a process-controlled variable, the method which comprises defining the knowledge-based control rules as a plurality of continuous, substantially non-linear mathematical functions; and analytically combining the plurality of the continuous substantially non-linear mathematical functions to form the process-controlled variable.

The steering and control method has the advantage of needing no mathematical model. By using simple functional instructions, a very high sampling frequency and therefore, even in complicated control jobs, the necessary real-time capability, can be attained.

In accordance with another mode of the invention, there is provided a method in which the number of input variables (measured values, interference variables) is at least two. Special advantages of the steering and control method according to the invention can be expected if such a method is carried out. Since it is possible to offer interference variables as input variables, these variables act permanently upon the actuating variables. No special dynamic requirements therefore need to be taken into account.

The advantages of a fuzzy controller can be utilized without the need for accepting its disadvantages. That is, a favorable effect can be attained by achieving what is known as fuzzy control. To that end, in accordance with a further mode of the invention, there is provided a method in which various values, as knowledge-based actuating variables, are associated with certain process states.

In accordance with a concomitant mode of the invention, there is provided a method in which adaptations along the lines of trial and error can be achieved in a simple way, by varying normalizing or denormalizing functions, or by adjusting the control rules on which the control function instructions are based in order to form the actuating variables.

Other features which are considered as characteristic for the invention are set forth in the appended claims.

Although the invention is illustrated and described herein as embodied in a method .for controlling a function unit with a steering and control device, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIG. 9 is a table showing examples of input variables and output variables for coordinated control rules;

DESCRIPTION OF THE PREFERRED EMBODIMENTS

Figure 1:
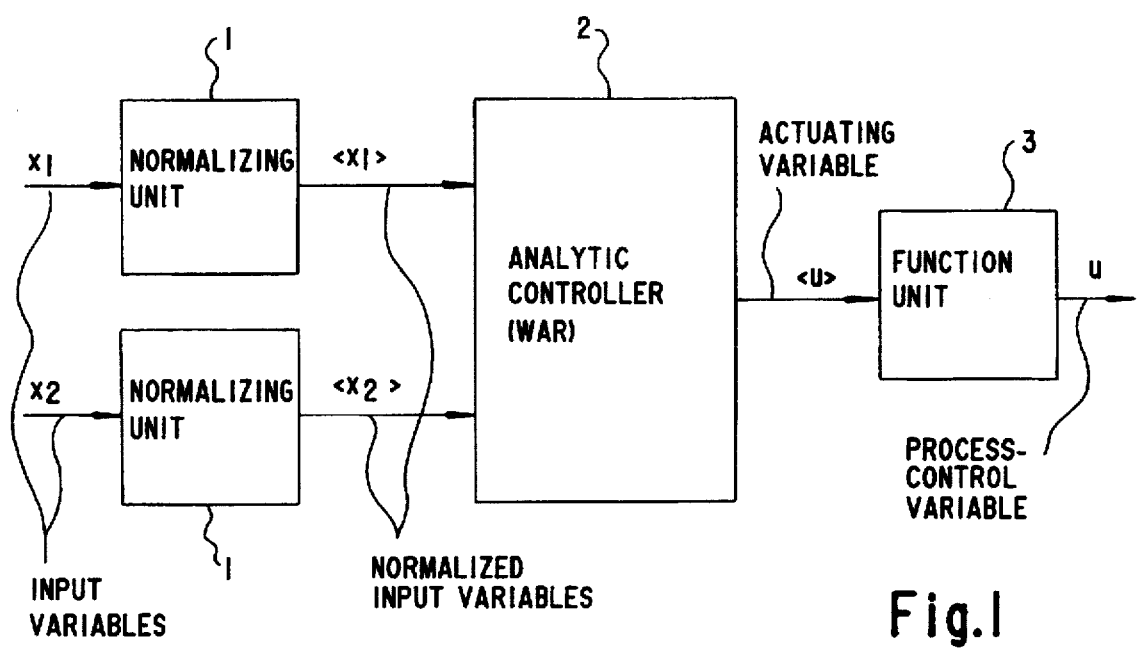
FIG. 1 is a block circuit diagram of a basic module of a steering and control device.

Referring now to the figures of the drawing in detail and first, particularly, to FIG. 1 thereof, there is seen one possible structure of functional units of a basic module for a steering and control method according to the invention, in which one analytic controller module 2 is shown for receiving two normalized input variables $<x_1>$, $<x_2>$ and generating one actuating output variable $<u>$. The input variables $x_1$, $x_2$ are each first delivered to a respective normalizing unit 1, which sends the normalized input variables $<x_1>$ and $<x_2>$ to the analytic controller 2, that can be referred to as a knowledge-based analytic controller (WAR). The analytic controller 2 outputs a normalized actuating variable $<u>$, which is converted in a self-contained denormalizing function unit 3 into the physical process-control variable u. It is understood that a basic module of this kind may be preceded by dynamic correction elements in a known manner, to assure correlation among a plurality of input variables $x_1$, $x_2$.

Moreover, hierarchical structures for multivariable steering and control tasks can be formed from a plurality of such basic modules.

The mode of operation of the analytic controller 2 will be described below in conjunction with FIGS. 5 and 6.

The analytic controller 2 could also be supplied directly with the physical input variables, instead of normalized input variables. However, normalization, in other words weighting or transformation of process or input variables, is practical. Normalizing functions may be used, among other purposes, for setting the controlled variable and for effective weighting of the influence of the process or input variable. Correspondingly, the denormalizing function is suitable for influencing the effect of the actuating variable $<u>$ and is comparable to amplification. It is proposed that descriptive, illustrative, representative or picture terms be associated with the process controlled variables and actuating and input variables.

Figure 2:
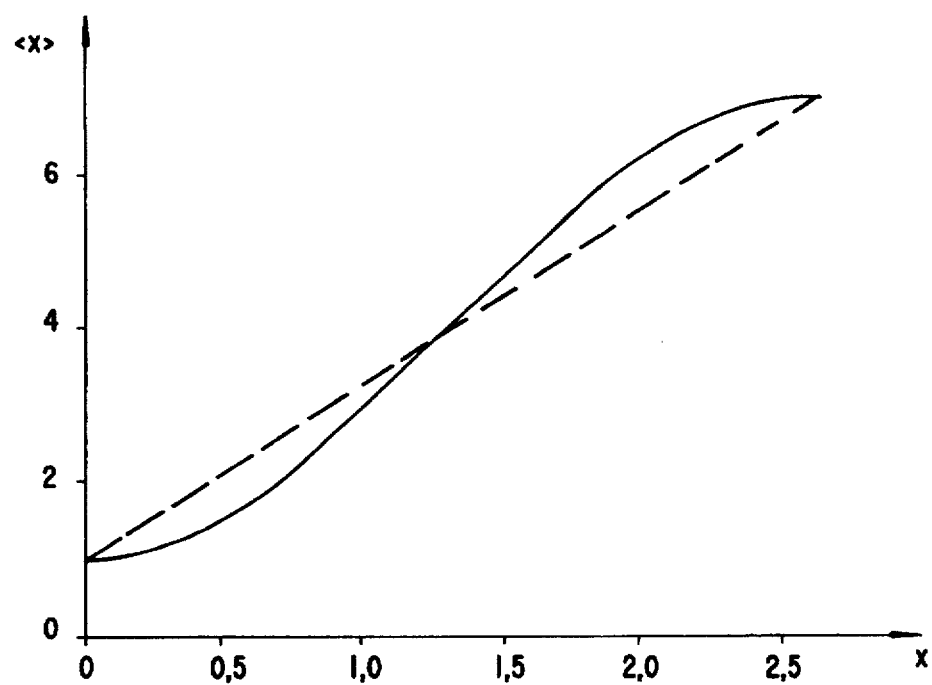
FIG. 2 is a graph of an example of a normalizing function.

FIG. 2 shows a characteristic curve as an example of a normalizing function, in other words a conversion of a physical input variable x into a normalized input variable $<x>$.

Figure 3:
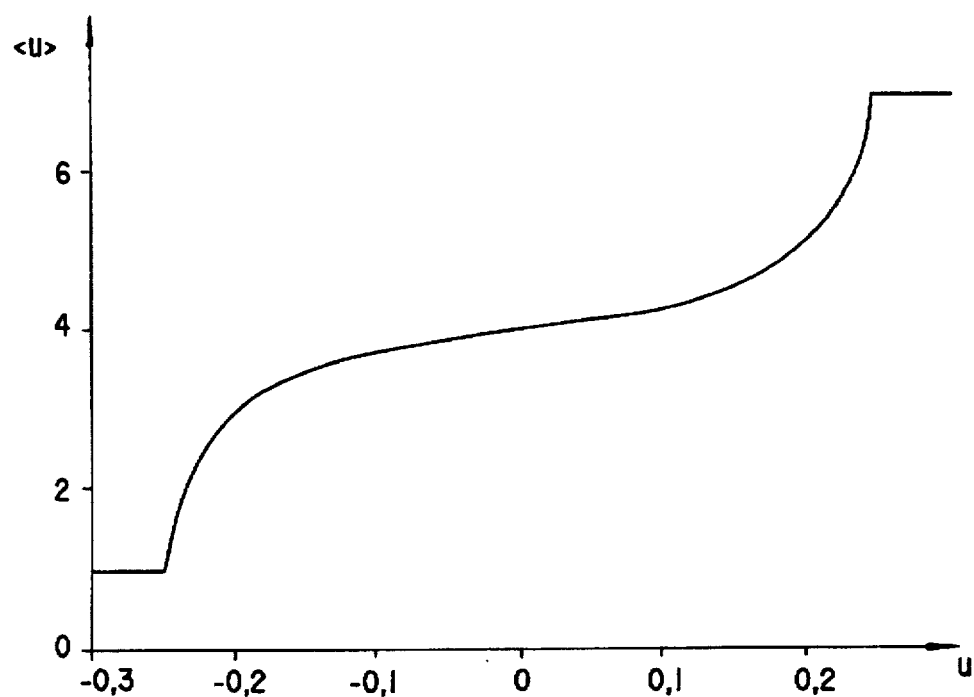
FIG. 3 is a graph of an example of a denormalizing function.

FIG. 3 shows a characteristic curve as an example of a denormalizing function, in which a normalized actuating variable $<u>$ is converted into a physical actuating process-control variable u.

Figure 4:
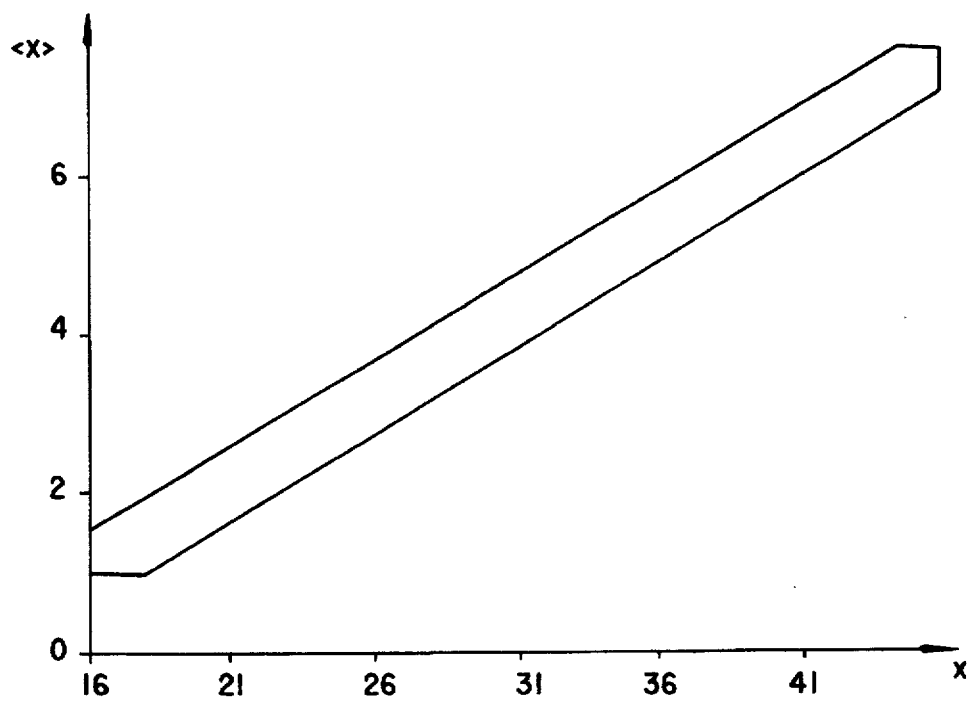
FIG. 4 is a graph of an example of a two-valued normalizing function.

The instructions for the normalization or denormalization can be selected freely but in general should be determined in accordance with technological and technical requirements. The normalizing variables may also be multi-valued, for the sake of achieving indistinctness, i.e. "fuzziness". FIG. 4 shows as an example a characteristic curve for a two-valued normalizing function.

The mode of operation of the analytic controller 2 will be described below in conjunction with FIGS. 5 and 6, which should be studied together.

The concept "control rule" is identical to the value of the setting variable in a selected process state (i.e. a working point of the process).

A control rule is different from the value of a setting variable in an arbitrary process state in that it is required as a correct value on the basis of available "know-how" of the process, or is obtained as a given value. Accordingly, the controller must produce or generate the exact setting value as required by the control rule for realizing the selected process state.

Figure 5:
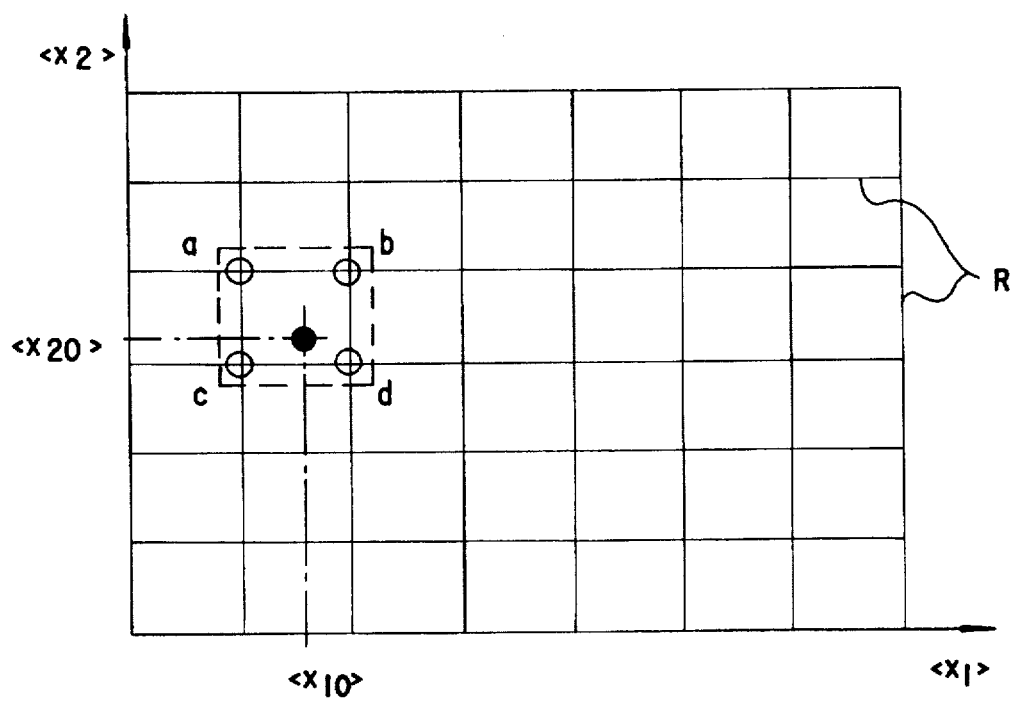
FIG. 5 is a graph of a two-dimensional matrix of control rules.
Figure 7:
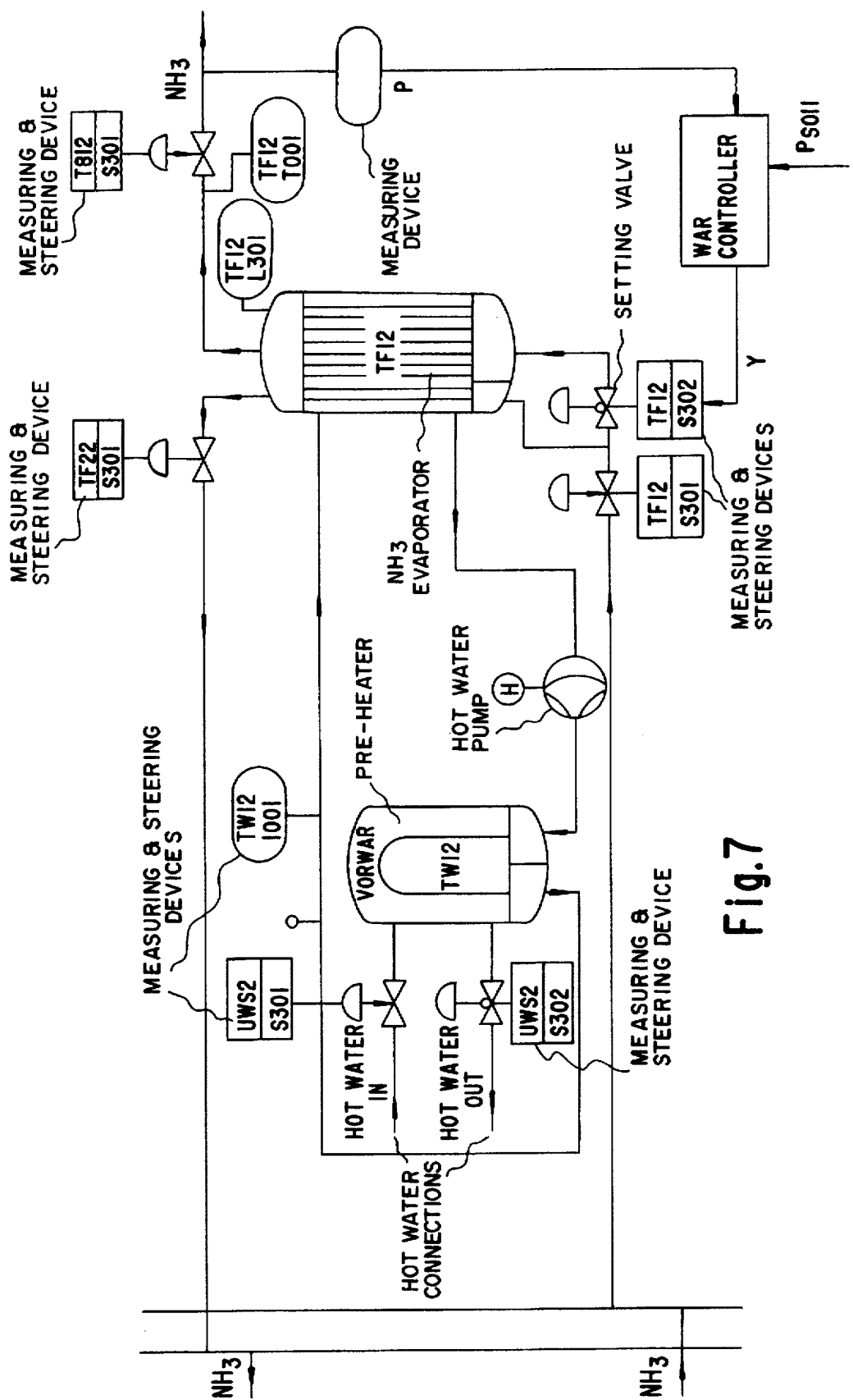
FIG. 7 is a diagram of an ammonia-evaporation station shown as an example illustrating the method according to the invention.

FIGS. 5 and 7 show the use of cartesian coordinates for presenting the value of the control rules. Since both input values are determined by their coordinates, a grid pattern is formed, which is identical to the matrix for entering the control rules.

Obtaining the control rules is performed in practice by evaluating data for the measured values of the process, by means of subjective observations or from descriptions of the plant.

FIG. 5 shows a two-dimensional matrix for control rules, in which normalized values $<x_1>$ and $<x_2>$ of the input variables $x_1$ and $x_2$ are plotted. In the example shown, the values of the first input variable $x_1$ may be associated with eight representative or illustrating values $<x_1>$, and values of the second input variable $x_2$ can be associated with seven representative or illustrating values $<x_2>$. The value combinations for normalized input variables $<x_1>$ and $<x_2>$ can be shown in the matrix with raster lines R as an intersection and each corresponds to one specific process state. The combination of the input variables $x_1$ and $x_2$ can be performed by a selected method. Cartesian or polar coordinate systems, for instance, are suitable.

The steering and controlling method must be capable in every process state of forming a setpoint actuating variable value $<u>$ based on control rules, in other words based on a control function $<u>=f[<x_1>; <x_2>]$. However, the control rules are not known continuously for every process state, but rather for only some discrete process states, since control rules for individual process states may, for instance, be known from measurements or calculations. For instance, control rules may be known for boundary conditions. FIG. 5 assumes that the control rules for points of the matrix marked with reference symbols a, b, c and d are known (knowledge-based control rules). In the case of the process states marked by the points a, b, c and d in FIG. 5, based on the known control rules, the appropriate normalized variables $<u_a>$, $<u_b>$, $<u_c>$ and $<u_d>$ are also known, as is seen in FIG. 6. In FIG. 5, one further process state is plotted, which is defined by normalized input variables $<x_{10}>$ and $<x_{20}>$ and for which a pertinent actuating variable $<u_0>$ is to be formed. In the case of this process state, the vicinity of the four known control rules is defined by points a, b, c and d.

Figure 6:
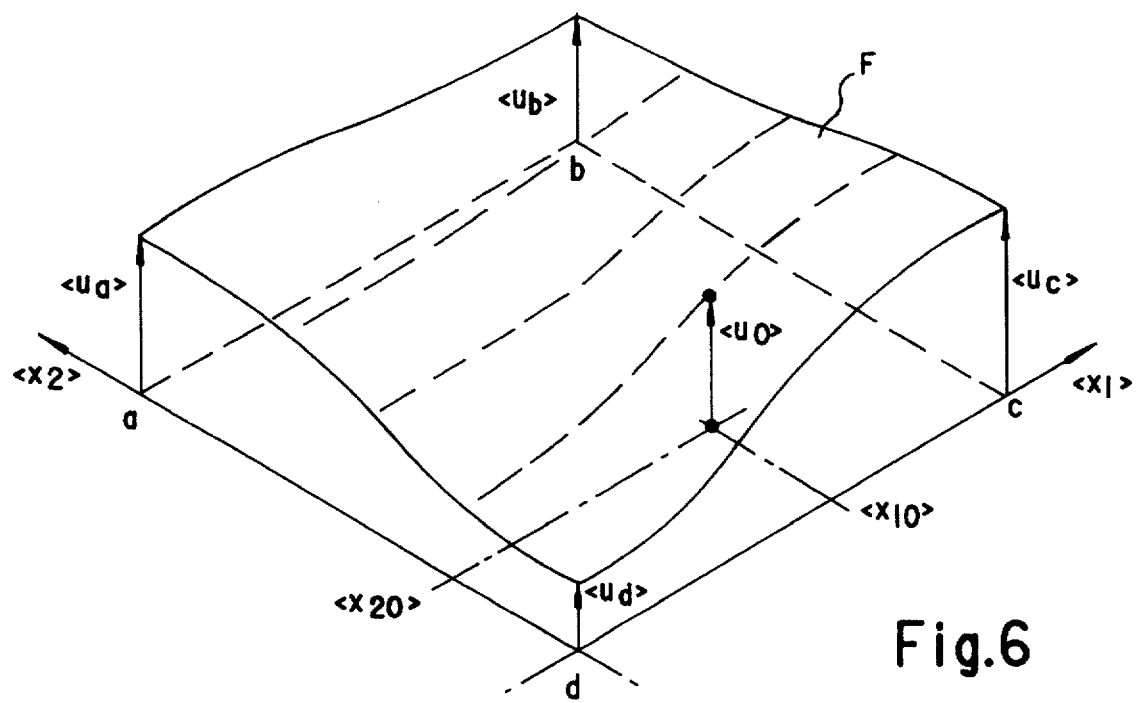
FIG. 6 is a diagram of the formation of a functional instruction of a controller.

FIG. 6 shows an example a control space function for process states in the region of the points a, b, c and d. In a control function area, the two normalized input variables $<x_1>$ and $<x_2>$ are plotted orthogonally. In the third dimension (coordinate direction), the known normalized correcting variables $<u_a>$ through $<u_d>$ are represented as arrows. The known control rules of the points a, b, c and d are linked by a mathematical function. This mathematical function defines the control rule sought for forming the actuating variable $<u_0>$ for the process state in accordance with the input variables $x_{10}$, $x_{20}$. In the drawing, the actuating variable $<u_0>$ to be formed corresponds to the geometric distance of a control function plane from a landscape-like surface structure F.

This explains how a knowledge-based analytic controller forms a controlling i.e. actuating variable. The mathematical function used to link known control rules is selectable. In order to avoid discontinuities in the controlling or actuating variables, the mathematical function must be continuous. It may be linear, but in general it will be non-linear and should be adapted to the characteristics of the particular process, such as those of the particular portion of the operating range.

It will generally not be practical to work with a functional instruction that is valid for the entire operating range. A subdivision into partial functional instructions is therefore proposed, each of which is valid for a certain portion of the process operating range. The example described in conjunction with FIGS. 5 and 6 could accordingly apply to a partial functional instruction. The partial functional instructions are linked together, and at the connecting points, that is in the immediate vicinity of the process states marked by knowledge-based control rules, if at all possible no changes in actuating or controlling variables should occur. The partial functions are therefore suitably selected in such a way that the function deviations in accordance with the process or input variables become zero at the intersecting or connecting points.

In a further mode of the functional instruction or partial functional instructions implemented in the steering and control method, an association of the process or input variables with a plurality of actuating and controlling variables may be included.

In order to obtain a fuzzy controller, different values of the actuating variables may be specified for the same process states, for all control rules or for selected control rules, so that a plurality of functional instructions may be employed for the dependency of the actuating variables on process states. Expressed in other words, this means that a multi-valued determination of actuating variables is possible, in that work is done repeatedly with different parameters of the functional instruction, and the results are superimposed. Thus for one process state, an arbitrary number of values of actuating variables can be determined, and the evaluation and superposition of which produces the requisite unique actuating or controlling variable.

In order to illustrate the method according to the invention, an example relating to an ammonia evaporation station is described below in connection with FIGS. 7–12.

The problem being addressed in this example is that of controlling the vapor pressure in an ammonia ($NH_3$) evaporation station of an actual power plant.

FIG. 7 shows the technical layout of a denitrification plant portion of the power plant, with an ammonia ($NH_3$) evaporator station.

The control problem resides in maintaining the ammonia vapor pressure p at a given required vapor pressure value $P_{Soll}$ at the output of the $NH_3$-vaporizer, wherein the controller (in the following called the steering and control device) operates on the basis of comparing deviations between a measured pressure value p and the required pressure value $P_{Soll}$, caused by interference phenomena that interfere with the control process, determining the difference between these values, and cancelling the difference by means of changes applied to the control settings, i.e. setting valve adjustments, which are applied to a control valve.

Figure 8:
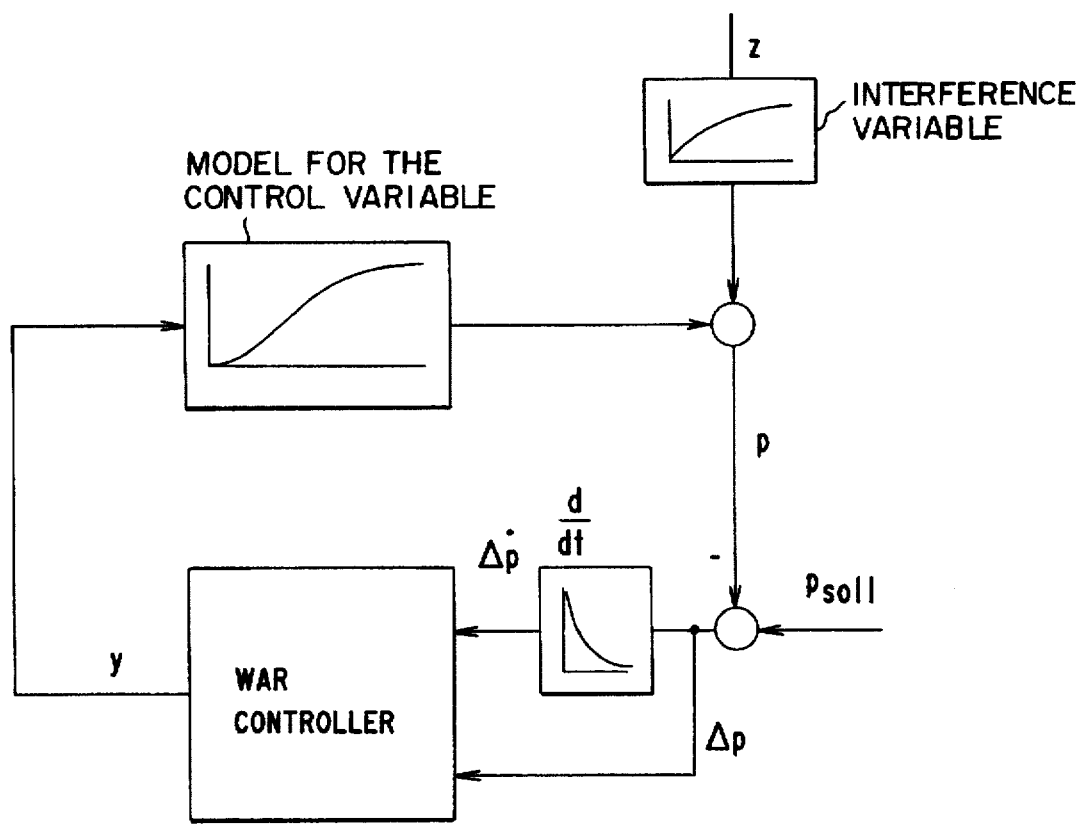
FIG. 8 is a basic control layout for the ammonia-evaporation station according to FIG. 7.

The main interference variable z is, according to experience, the change in output volume of $NH_3$ vapor in its basic structure, is as shown in FIG. 8, which shows the basic structure of a control layout for the Ammonia-Vaporpressure. As described above, the functional instructions for the steering and control device depends on a model of the control rules, wherein the values used in these rules, per se, are values which are process states that are understood to be selected as suitable values. Such values can under actual circumstances be obtained as measurements or by suitable observations as described in relation to FIG. 5.

The process states are defined by the values of the input variables to the controller.

The controller is a proportional differential (PD-) controller, operating so that the input variables to the controller are $\Delta p$ (wherein $\Delta p = p - P_{soll}$), and the time change $\Delta p/dt = \Delta \dot{p}$.

The ability to select the PD-behavior is part of the basic knowledge possessed by flow-technicians, who would know that instead of a PD-behavior, it would also be possible to use for example PI-behavior (i.e. "proportional-integral" behavior), so that instead of $\Delta p$-behavior, a behavior such as $\int \Delta p \, dt$ could be used. In other words, the control parameter can be either the derivative or the integral of the control variable.

Since the control rules are to be regarded as values of the settings in selected process states, it would be clear to the person of ordinary skills in the appertaining art, how to determine and define the control rules on the basis of a reading of measured values obtained from the actual operation, such as shown as an example in the table of FIG. 9.

In FIG. 9 six process states define six control rules according to the values from the table in FIG. 9. The number of defining control rules may in principle be selected arbitrarily, i.e. all 49 control rules could be recorded as measured values, if, for example, in the coordinate systems of FIG. 5, all of the seven different values had both input variables assigned to each node of the grid by means of control rules.

It is previously described how to normalize, i.e. by means of the normalizing function in FIG. 2, or how to de-normalize the output values of the controller (see de-normalizing function in FIG. 3).

The significance of normalizing and denormalizing can be selected arbitrarily, or even completely deleted, as described above.

For the sake of simplicity linear functions can also be used, if such were applicable in a layout of the steering controller, according to the invention.

Figure 10:
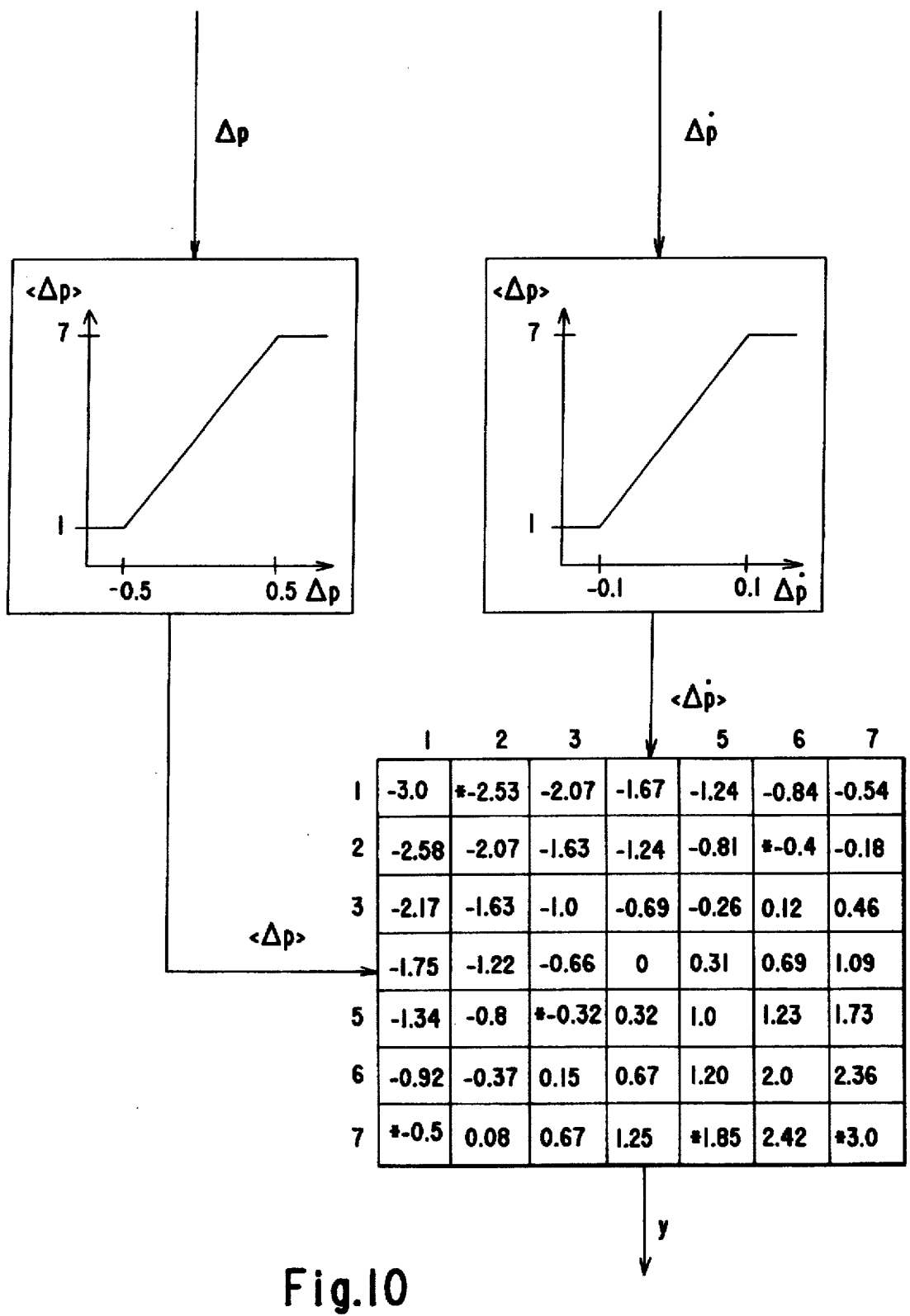
FIG. 10 shows a layout of control rules for the pressure controller according to FIG. 7.

FIG. 10 shows the matrix of control rules. It should be noted that the six control rules are shown in heavy type. The remaining 43 control rules may similarly be determined by reading the measured data. However, in practice, it is also often possible to determine the control rules from subjective evaluation and approximation.

In FIG. 9, corresponding to FIG. 5, this figure shows a range of pressure differences $\Delta p$ from $-0.5$ to $+0.5$ bar and the altered rate of change $\Delta \dot{p}$ within a range of $-0.1$ to $+0.1$ bar/sec as determined from experience with the process. In terms of value range, both normalizings were based on values obtained in columns 1–7, but it follows that these values could have been chosen arbitrarily, and that column values 1–5 or 1–15 could have been chosen. In actuality such choices could be made intuitively based on knowledge of the control behavior.

The denormalizing function has not been shown due to the simplicity of the example demonstrated, since the actual physical values shown could be used for the control rules.

The form of representation chosen for FIG. 9 above was selected due to its compactness, but the representation shown in FIG. 1 could as well have been chosen.

In order to compute the values of the setting variable from suitable input values, a control space function is used as described above, wherein the mathematical form may be arbitrarily selected, and determined on the basis of an understanding of the process behavior. No particular rules are therefore necessary for this determination. From the specification it follows that the control space functions combines several control rules. From this requirement the person of ordinary skills will be able to deduce, due to his mathematical background, that the control rules must be the solutions to the control space function, and that the arrangement of the control space is determined by the number of coordinates. In the present case three coordinates are shown (two input and one output value). The setting variable is substantially equal to the variable y, shown in FIGS. 8, 9 and 10.

In order to determine the control rules from selected values of the setting variable in the form of a mathematical function, it can be stated that this mathematical function is actually an interpretation, as known from numerous areas of technology. In this regard it is necessary to determine process values on the basis of known points, which provide functional relationships between functional process variables and knowledge of their total behavior.

Figure 11:
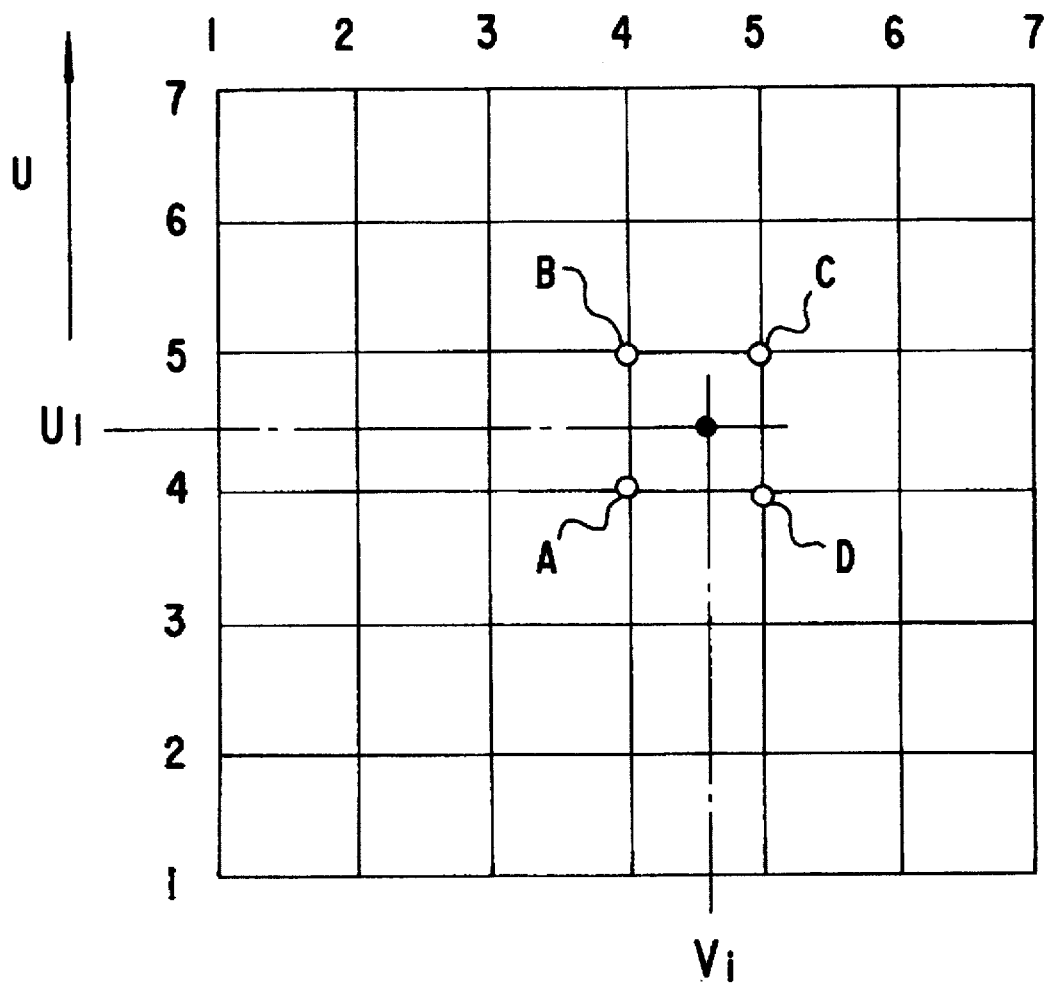
FIG. 11 shows a diagram for determining a control function space.

In regard to the question of selecting the mathematical function the following should be noted:

a) In regard to the number of variables, i.e. for the function of the output variable y as a function of input variables $u=\Delta p$ and $v=\Delta \dot{p}$, a general function such as y (v, u) is to be used.

b) The functional combination of variables, wherein the mathematical form has multiple dimensions, two possibilities are available:

b1) a nonlinear sine function:

$$y=(1-z_2)\,[z_1\,(B-A)+A]+z_1\,[z_2\,(D-C)+C] \qquad (1),$$

wherein $z_1=\sin^2(0.5\sigma u)$,
$z_2=\sin^2(0.5\pi u)$, and the description in FIG. 11 (wherein constants A, B, C and D have values, the points of which provide the given control rules); and b2) a double linear function:

$$y=A\,(1-u)(1-v)+Bu\,(1-v)+C\,(1-u)\cdot v+Duv \qquad (2)$$

c) The values of the constants in the combinatorial references, wherein the latter, as in b) above are defined by the control rule.

Equations (1) and (2) above are defining equations for computing the values of the setting variable for an arbitrary process point $(u_i, v_j)$ from the surrounding control rules A, B, C and D, and are used for determining the control function space. The latter is also true for the control space between points A, B, C and D. The partial control function space is thereby also defined.

The total control space (i.e. the space defined by the process states that act on the controller) having coordinates u and v is accordingly defined by multiple partial control space functions, which are advantageously of similar mathematical form. The various partial control space functions are different from each other, simply due to the particular parameters through which the respective control rules surrounding the respective control space are defined.

For the grid arrangement used in FIG. 11 above using coordinates u and v in seven respective values, it follows that accordingly 36 partial control spaces, and respective 36 partial control space functions are provided.

As shown in above equations 1 and 2, adjacent partial control space functions have equal values of the setting variable along their common border lines.

Accordingly, the values of the setting variable in arbitrarily selected process points $(u_m, v_n)$ can be determined so that it is first determined from the controller the control rules that surround this point. From these known control rules the parameters for the control space function at this location are determined, and from the latter the defining equation of the setting values in point $(u_m, v_n)$ is determined.

The grid nodes in FIG. 11 above corresponds to matrix elements shown in above FIG. 10.

Books that cover the procedure described above are, for example:

[1] Korn, G. A./Korn T. M. Mathematical Handbook for Scientists and Engineers, Mc Graw Hill Book Company 1968, pp. 682, and

[2] Schwetlick/Kretzschmar: Numerische Verfahren für Naturwissenschaftler und Ingenieure, Fachbuch Verlag Leipzig 1991.

In case the process behavior is strongly nonlinear, the use of a non-linear function model is readily available (e.g. a trigonometric function), but in such cases a cubic function or a linear function may be used if the non-linearity is not too severe, as described above.

Fundamentally it is always necessary to have a certain knowledge of the behavior of the process to be controlled. This is true for all control processes.

For the pressure controller a bi-linear function is used, which accordingly combine four control rules in a rectangular arrangement (see FIG. 11 above, and also FIGS. 5 and 6).

From FIG. 10, it is seen how the computational sequence of the controller is arranged, and wherein the connection with underlying mathematical knowledge of algebraic equations is made clear.

For an arbitrary process state the values of the two input variables define a point in the coordinate system of the control rules. The surrounding control rules define by their values the parameters of the control space function for this particular region of the control space (see also FIGS. 5 and 6).

In this manner this three-dimensional control space function leads to a defining equation for the setting variable in the particular process stated being considered, and for which two variables (in the input variables) the values are known, and only the further value of the setting variable at this location is unknown. A simulation of the controller according to the invention was made with a computer, which modelled the control range shown in FIG. 12. This figure shows curves of the control behavior. The results obtained with the control device according to the invention as applied to the denitrification plant are of equal quality.

Figure 12:
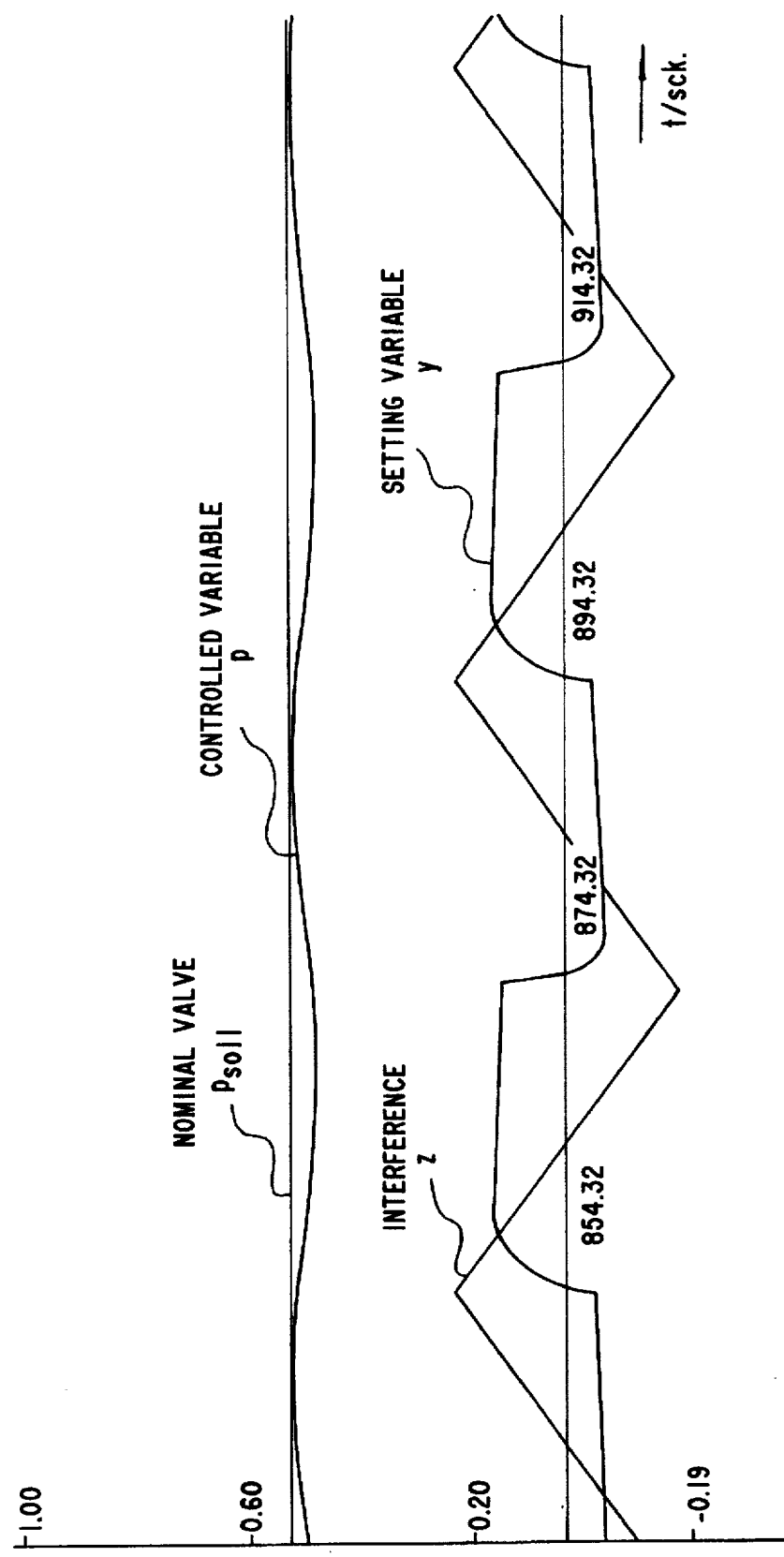
FIG. 12 shows a controlled variable and a setting variable with a superimposed interference value as functions of time.

The ramp-shaped interference curve $z(t)$ seen in FIG. 12 is compensated by the setting variable $y(t)$ such that only a small difference between the required value $P_{Soll}$ and the controlled value p is attained.

Figure 13:
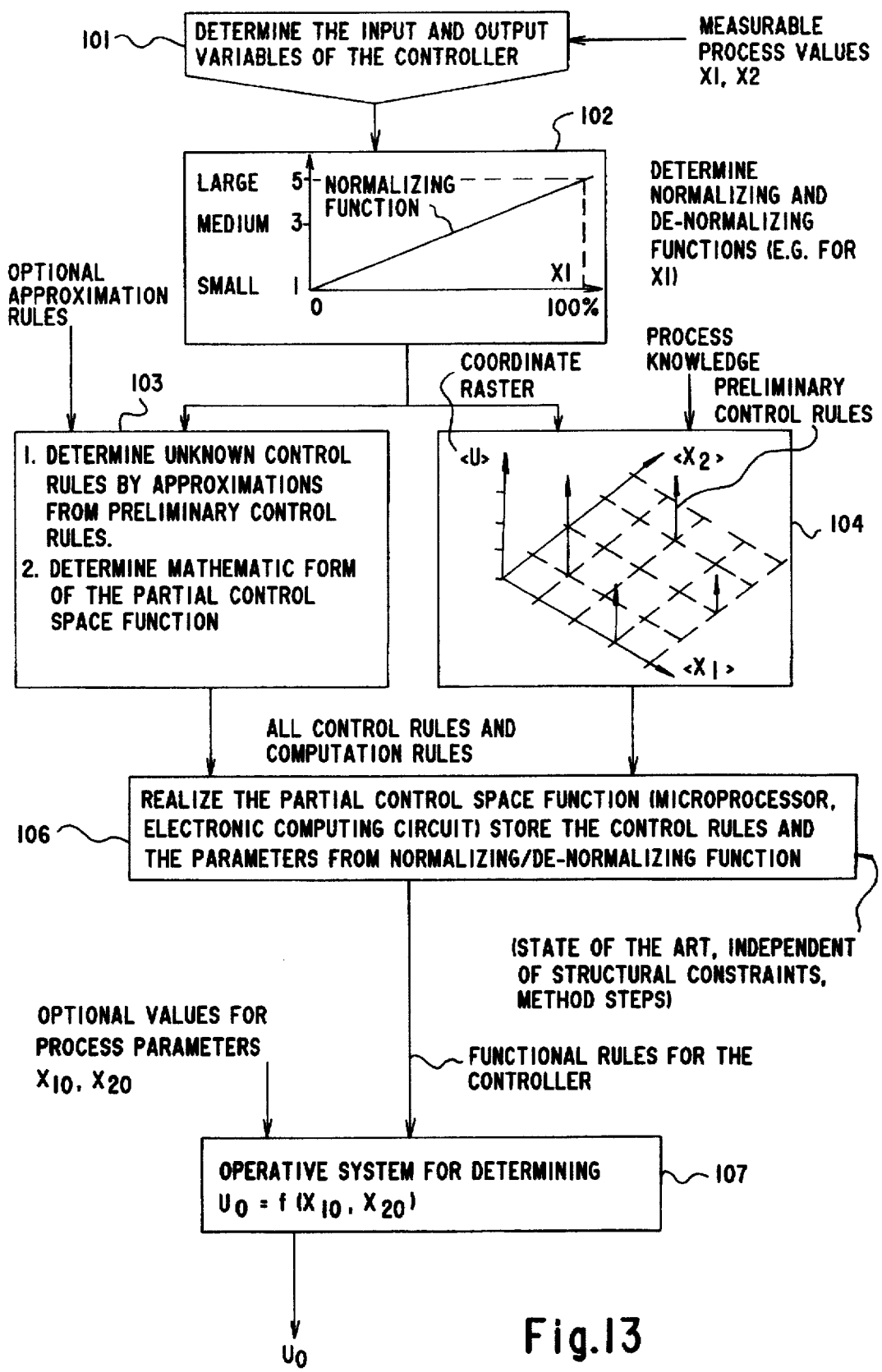
FIG. 13 shows a diagram of the step sequence of a control process and its embodiment.

FIG. 13 is a flowchart showing the steps of the disclosed method.

In step 101 the measurable process input variables $x_1$, $x_2$, etc. are determined, and normalized in step 102 according to the normalizing functions selected.

In step 103(1) the control rules are determined by means of approximations from preliminary control rules, and in 103(2) suitable mathematical forms of the partial control space function is determined. In step 104 alternatively or concurrently preliminary control rules are determined on the basis of process knowledge of the particular processes to be performed. Optional approximation rules may also be entered.

In step 106 the partial control space is realized on the basis of the results obtained from steps 103 and/or 104. The realization may be by means of microprocessors or computing electronic circuit and the control rules and parameters from normalizing/denormalizing are stored. Any state of the art means as may be suitable will be considered in step 106.

In step 107 the functional rules as received from step 106 and any optional values for the process parameters $(x_{10}, x_{20})$ are also to be entered into process step 107, which generates the process controlled variable $u_c = f(x_{10}, x_{20})$.

We claim:

1. A method for steering and controlling a functional unit with steering and control apparatus, the steering and control apparatus including a plurality equal to n of normalizing units, each normalizing unit having an input for receiving a respective input variable and being operative for generating a respective normalized variable (x); an analytic controller having a plurality of inputs being equal to at least the plurality n of normalizing units, for receiving the normalized variables, the analytic controller being operative for analytically combining the normalized variables in accordance with a plurality of knowledge-based control rules to form an actuating variable, wherein the knowledge-based control rules include steering and control variables (u), which are assigned point-wise to the selected normalized variables (x); and a function unit having an input receiving the actuating variable, the function unit being operative for generating a process-control variable, the method which comprises the steps of:

defining the knowledge-based control rules as a plurality of continuous mathematical functions, wherein the continuous mathematical functions include at least one continuous linear mathematical function;

forming an (n+1) dimensional control space subdivided into partial control spaces wherein for subdividing the control space the value range of the normalized variables (x), and the value range of the control variables (u) are divided into a selected number of partial functions, said partial functions forming a grid defining physical and/or abstract values and analytically combining the plurality of the continuous mathematical functions to form the process-control variable.

2. The method according to claim 1, which comprises:

subdividing the continuous mathematical functions into partial functions, each partial function defining a section of one of the knowledge-based control rules.

3. The method according to claim 2, which comprises:

delimiting the mathematical functions into boundary points, the boundary points defining the limits of the subdivided partial functions; and defining the dividing points as points wherein the deviations along the functions become zero or only slightly change in an area around the dividing points.

4. The method according to claim 2, which comprises: combining at least one of the knowledge-based control rules with process-controlled variables.

5. The method according to claim 1, which comprises:

defining the normalized variables and the actuating variables as respective sets of representative point values, and normalizing the representative point values.

6. The method according to claim 1, which comprises:

providing a plurality of normalized variables equal to at least two.

7. The method according to claim 1, which comprises:

applying a plurality of different normalized variables to at least one of the knowledge-based control rules, and applying a plurality of normalized variables to selected process states to form a fuzzy control method.

8. The method according to claim 1, which comprises:

forming the knowledge-based control rules on the basis of a plurality of mathematical functions, and replacing the continuous mathematical functions with a plurality of individual functions.

9. Steering and control device having an operation based on knowledge-based control rules (a–d), wherein the knowledge-based control rules (a–d) are assigned point-wise to selected process states, and wherein a plurality of control rules are combined with at least one linear mathematical function, by means of which a plurality of steering and control variables (u) are determined for selected process states, and wherein the mathematical function is controlled by a plurality (n) of input variables (x), the device comprising an analytic controller for forming the steering and control variables and having inputs for receiving the input variables, (a) an (n+1) dimensional control space defined by the n input variables and a plurality of output variables, said control space being subdivided into partial control spaces, wherein the value range of the input variables (x) and the value range of the output variables are divided into a selected number of partial functions for subdividing the control space, and a grid defining physical and abstract values formed by said partial functions;

(b) an n-dimensional landscape-like surface (F) within the control space, wherein the grid of input variables being formed by divided lines, said dividing lines being disposed orthogonally, each partial control space being defined by two pairs of said orthogonally disposed dividing lines;

(c) a working point selected within a partial control space, said working point defined by selected input variables, and a mathematical function defined as a partial control space function determined for said selected working point; and (d) said working point being surrounded by the control rules, and a defining equation formed with the partial control space function, the defining equation having coefficients determined by means of the control rules surrounding the working point, wherein said control rules are known, and wherein said control rules are derived from process knowledge and/or as approximations to known control rules.

10. Steering and control device according to claim 9, wherein said control rules comprise a plurality of continuous mathematical functions and include at least one non-linear function.

11. Steering and control device according to claim 9, wherein said partial control space is selected such that on the process states marked by knowledge-based control rules only small steering and setting variable changes are generated, and wherein as the partial functions derived from the input variables go to zero, left or right side crossing deviations between partial control spaces become of equal size.

12. Steering and control device according to claim 9, wherein selected physical values for the input variables are assigned abstract values, and this assignment is performed by normalizing and de-normalizing functions.

13. Steering and control device according to claim 9, wherein at least one of the control space and partial control space of the steering and control device includes an assignment of the input variables to a plurality of the control variables.

14. Steering and control device according to claim 9 wherein the number of input variables is at least two.

15. Steering and control device according to claim 9, wherein a fuzzy control mode is attained by means of applying to selected knowledge-based control rules multiple different values, whereby for selected process states respective control space functions are applied to the dependency of the steering and control variables on the process states.

16. Steering and control device according to claim 9, wherein a partial control space is composed of multiple mathematical functions, wherein a steady, generally non-linear change in the function value is replaced with multiple individual function increments.

* * * * *